(No Model.)  G. M. & J. A. BRILL.  2 Sheets—Sheet 2.
ELECTRIC MOTOR CAR TRUCK.
No. 588,391.  Patented Aug. 17, 1897.
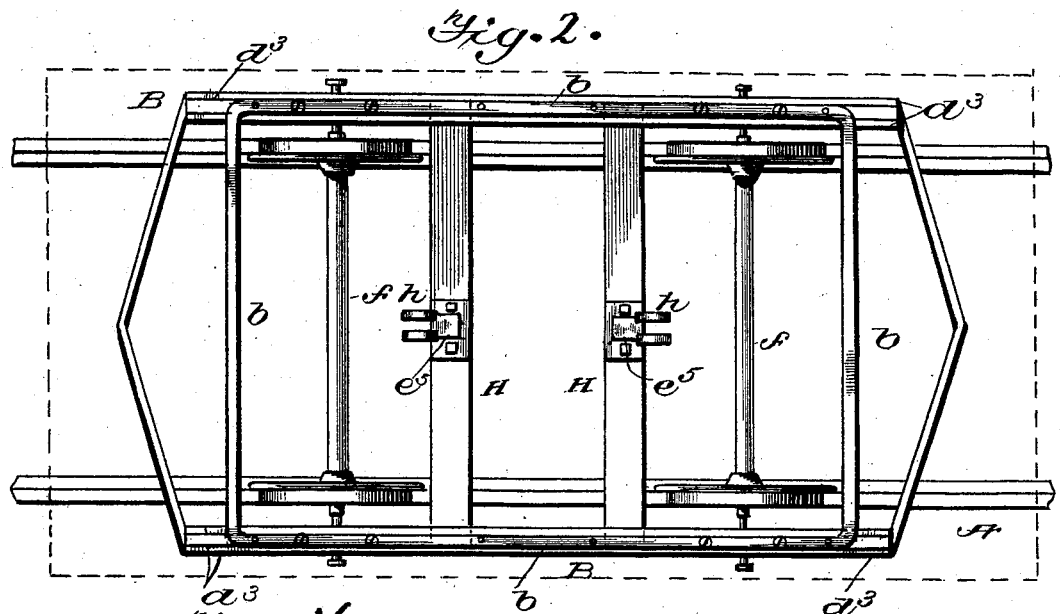
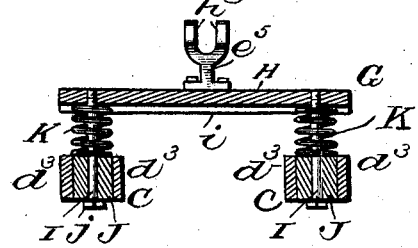
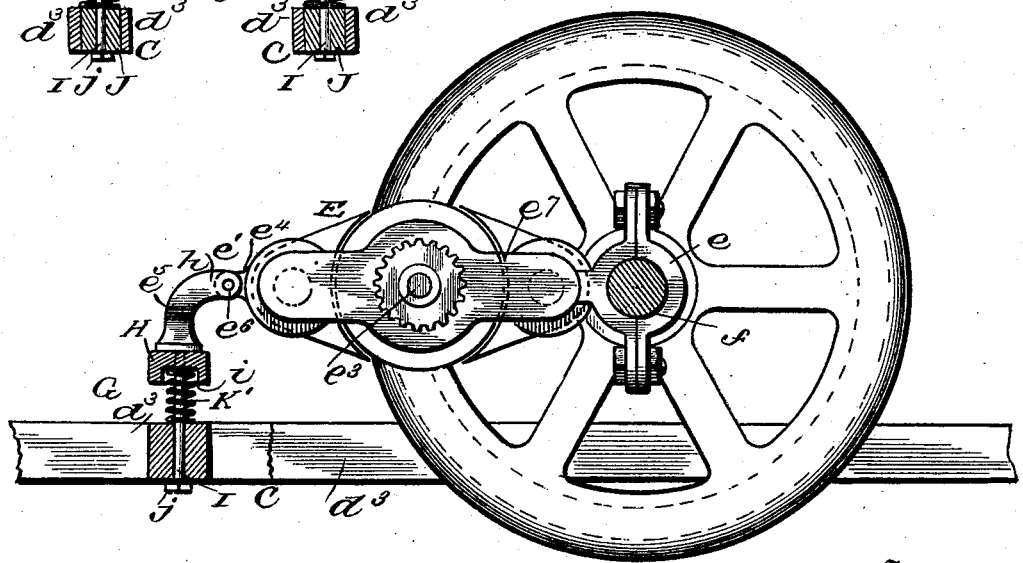
Witnesses
Inventors
John A. Brill and
George M. Brill
by Joseph L. Levy
Attorney

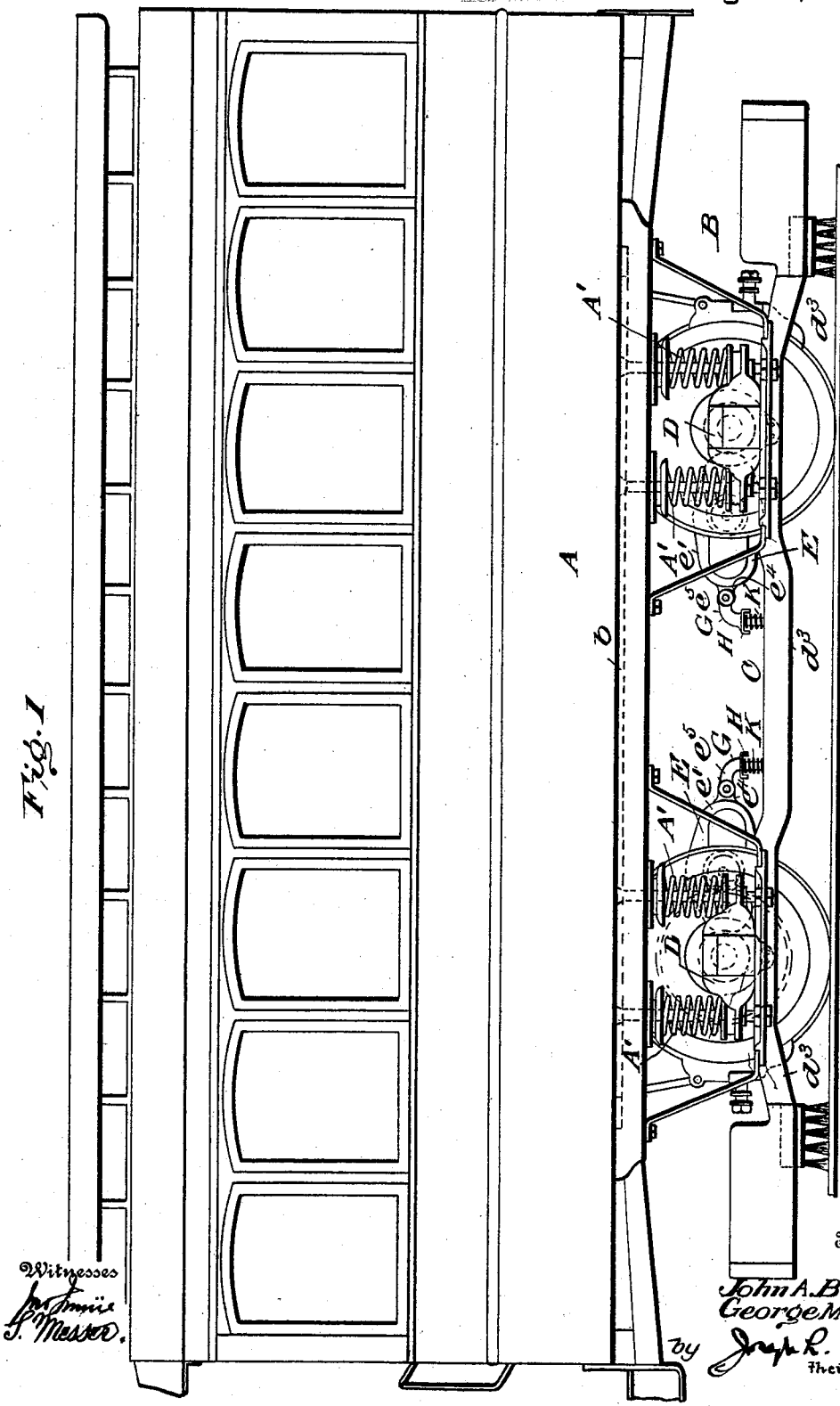

UNITED STATES PATENT OFFICE.

GEORGE MARTIN BRILL AND JOHN A. BRILL, OF PHILADELPHIA, PENNSYLVANIA.

ELECTRIC-MOTOR-CAR TRUCK.

SPECIFICATION forming part of Letters Patent No. 588,391, dated August 17, 1897.

Original application filed June 25, 1888, Serial No. 278,160. Divided and this application filed March 25, 1890. Serial No. 345,189. (No model.)

*To all whom it may concern:*

Be it known that we, GEORGE MARTIN BRILL and JOHN A. BRILL, citizens of the United States, residing at Philadelphia, in the county of Philadelphia and State of Pennsylvania, have invented certain new and useful Improvements in Electric-Motor Railway-Trucks, of which the following is a specification.

This invention has relation to railway-car trucks having an electric equipment of the form wherein the motor at one end is sleeved or hinged to one of the truck-axles and its other or free end is supported so as not to be subject to the action of the system of springs supporting the car-body or truck-frame; and it has reference to the subject-matter shown and described in the United States Letters Patent granted to us on the 15th day of April, 1890, No. 425,653, application for which was filed June 25, 1888, Serial No. 278,160, and of which the present application is a division.

Only so much of the matter shown and described in the above patent as affects the present invention will be described herein, cross-reference being made to the above patent for the matters shown and described and claimed therein.

This invention has for its primary object to mount the free end of an electric motor upon a frame joining the axle-boxes of the truck or car-body that the axles may have their usual independent movements in curving and canting, that the oscillation of the free end of the motor due to the hammering of the wheels on the rail and to the stopping and starting of the motor is reduced to a minimum, and that the free end of the motor is cushioned against the strains or thrusts incident to stopping and starting the motor, whereby an easy and smooth riding car-body and truck is secured, which is free from the working strains or thrust of the motor, and the full available efficiency of the motor is utilized for propelling the car instead of being partly consumed unnecessarily in overcoming frictional or other faulty or improper mounting of the motor on the truck or running-gear.

This invention accordingly consists of combinations, constructions, and arrangements of parts, as hereinafter more particularly described in the specification and pointed out in the claims.

Reference is had to the accompanying drawings, wherein—

Figure 1 is a side elevation of a truck and superposed car, illustrating an embodiment of certain features of improvement hereinafter described. Fig. 2 is a plan of the truck without the motor. Fig. 3 is a sectional elevation, drawn to an enlarged scale, of one of the axles and wheels, part of the axle-box frame, and an electrical motor, showing the latter supported at one end on an axle and having a yielding or spring-supported connection at its other or free end with the frame on the axle-boxes. Fig. 4 is a transverse sectional elevation showing the arrangement or construction of the yielding connection or support of the free end of the motor on the axle-box frame.

In the drawings, in which similar letters of reference indicate corresponding parts throughout the several views, A is a car-body, and B a truck-frame, of any preferred or desirable construction, supporting a spring system for upholding the car-body, said system comprising in this special instance the springs A', seated on the axle-boxes. The springs for supporting the top frame or the car-body may also be arranged as disclosed in said patent. Said truck, as shown, may comprise a main or upper rectangular top frame $b$, having openings for bolts when said frame is to be rigidly secured to the car-body between its ends, so as to be removable therefrom, for purposes fully set forth in said before-stated patent.

C represents an "axle-box" frame, so called by reason of its being separate from or independent of the truck-frame B, and is supported upon, attached to, (as by pendent lugs, dotted lines, Fig. 1,) or otherwise derives its support from the axle-boxes D, outside of the wheels of the truck, in any suitable manner, (or as described in said patent,) so as not to interfere with the usual independent movements of the axles and wheels necessary for smooth and easy riding of the truck or running-gear nor be influenced by the movements of the car-body on the car-spring system.

The side bars of the axle-box frame may be single bars, or preferably parallel bars separated from each other with their edges turned up, as shown more plainly at $d^3\ d^3$ in Fig. 4, (in plan in Fig. 2,) in order to provide side bars of light weight, but of strong and unyielding construction, for supporting the motor, as hereinafter explained, which side bars may be secured to or supported upon the truck-axle boxes, as shown and described in said patent.

E represents an electric motor of the usual or preferred construction located between opposite axles of the truck, having one end $e$ constructed as a bearing and sleeved, hung, or otherwise suitably mounted upon the driving-axle $f$, (seen more plainly in Fig. 3,) and its other or free end $e'$ is provided with a mechanical connection G, upheld by the axle-box frame C.

The connection G consists of the following construction: At H is a cross-bar, preferably of channel-iron, as shown, with downward flanges, to which is secured an upwardly-extending bracket $e^5$, having a curved and bifurcated extension $h$, to which a lug or bifurcation $e^4$ on the free end $e'$ of the motor is either pivotally or fixedly secured by the pin $e^6$. The cross-bar H crosses the longitudinal center line of the motor or the corresponding center line of the truck to provide a central support for the free end of the motor. At or near the ends of cross-bar H are secured posts I, which extend downwardly and pass loosely through spacing-blocks or thimbles J when the parallel bars $d^3$ are employed, and to which latter the thimbles are fixed, or, if single-piece side bars are used, the posts will pass directly through them. Upon either the thimbles J, when the bars $d^3\ d^3$ are employed, or on the single-piece side bars rest coiled springs or other cushions K, surrounding the posts I, the cross-bar H resting on their upper ends, the flanges $i$ acting, if desired, as a spring-cap to receive and restrain the sliding of the springs, as shown in Fig. 3. The lower ends of the posts are threaded and provided with nuts $j$ to prevent withdrawal of the posts and to provide means for giving the desired amount of compression to the springs K.

By the foregoing construction an easy-riding spring-support for the free end of the motor is provided.

It will be seen from the foregoing that any tendency of the free end of the motor to vibrate is counteracted by the cushions or springs, which act to restore the movable parts to a state of rest, and that the vibration of the free end of the motor is not augmented nor sensibly influenced by the movements of the car on its springs, whereas, on the other hand, were the free end of the motor supported from the car-body or some movable portion of the truck the motor would be under the influence of the movements of the car on its springs, &c., which is very undesirable.

The motor-armature or driven shaft $e^3$ is suitably mounted in the motor-frame bars $e^7$, parallel to axle $f$, and may have suitable gear or other connections with said axle, as illustrated in said patent and in dotted lines, Fig. 1.

From the foregoing it will be noted that the motor is located between opposite axles of the truck, that one end of the motor is mounted upon the driven axle $f$ and the other end is upheld by a yielding connection from the axle-box frame C, which is independent of the truck or car-body spring-supporting frame or system, supporting the motor bodily between these two points, maintaining it at right angles to the axle and apportioning its weight between the axle and frame C. Further, that as the motor is sleeved at one end $e$ upon a driven axle $f$ and its driving or armature shaft $e^3$ has gear connection with the axle $f$ both the shaft $e^3$ and axle $f$ are maintained in parallelism, and as they, as well as other parts of the motor, move coincidently when the axle makes its independent movements in curving or canting, considerable of the strain or friction between the gearing on said axle and shaft is avoided; that as the free end $e'$ of the motor has a vertically-movable mechanical connection with the frame C (and an articulated connection at $e^6$) the motor is free to coincidently move with the axle $f$ as it curves or cants with but little, if any, strain or friction between the motor and its free-end connection; that as the free end of the motor or its extension $e'$ is cushioned by the springs K the strains, thrusts, or shocks incident to the stopping and starting of the motor are compensated for or absorbed by said springs, which also take up or compensate for the strains or jars incident to the hammering of the wheels on the rails and relieve the motor of the same. Further, the free end of the motor being located at a distance from the driven axle or the fulcrum of the motor-support and is cushioned by the springs K on the side bars at each side of the motor center, the extent of bodily oscillation of the motor at its free end under many conditions of service is reduced to a minimum and less powerful springs are required to cushion said free end than would be were the motor suspended from the car-body or a movable part of the truck or where the motor is supported centrally on the axle, in which case the overhanging portion of the motor adds to the force of the vibration, preserving its tendency to vibrate and giving its support greater labor, or where the motor is supported by centrally-located springs on a rigid cross-bar the motor is more effective and keeps in position below the top of the truck-frame or out of the way of the car-body, so that its height from the tracks may remain at the standard or be reduced as desired and a portion of the weight of the motor is taken from the axle and assumed by the free-end support instead of placing the entire weight on the axle as in the centrally-supported class; that as the frame C and the motor are independent of the truck-frame or spring-supporting system for the car-body the latter are not subject to the working strains of the motor, nor is the motor subject to the movement of such car-body or truck-frame, and a smooth and easy riding car-body is secured.

We do not limit ourselves to any particular form of construction for the axle-box frame disassociated from the motor-support, nor the means of suspending said frame from the axle-boxes, as it is apparent that our invention can be modified in these and other regards without departing from the spirit thereof.

What we claim, and desire to secure by Letters Patent, is—

1. In an electric-motor car, the combination of an electric-motor frame journaled at one end upon a car-axle, with a cross-bar elastically connected at each end with the truck-frame, and a mechanical connection between the other end of the motor-frame and the middle of the cross-bar, substantially as described.

2. In combination with a propelling-motor having a support on a car-axle by journal-bearings, and a truck-frame, of a motor-holder comprising a cross-bar having a yielding connection with the motor-frame in the middle, and an elastic connection also with the truck-frame at each end of said cross-bar, substantially as described.

3. In combination with a propelling-motor having a support on a car-axle by journal-bearings, and a truck-frame, of a motor-holder comprising a cross-bar having a pivotal connection with the motor-frame in the middle, and springs or buffers between the ends of the cross-bar and the truck-frame, substantially as described.

4. In combination, with a propelling-motor having a support on a car-axle by journal-bearings, and a truck-frame, of a motor-holder comprising a cross-bar with slot-and-pin connection between itself and the motor-frame in the middle and a spring or buffer at each end between the cross-bar and the truck-frame, substantially as described.

5. The combination, with a car, of a motor-frame comprising the yokes tied together and provided with projections, said frame being hung on a car-axle by journal-bearings in said projections, the armature, the field-magnets, the pinion on the armature-shaft, the gear on the car-axle engaged by said pinion, and the holder for the motor-frame, comprising a cross-bar supported on the truck-frame by springs and pivotally connected with said motor-frame, substantially as described.

6. In a motor-truck, its axles and boxes, of the frame supported by said boxes, a cross-bar, springs for supporting the bar on said frame, and a motor sleeved at one end on one of the axles, its free end supported by said cross-bar.

7. In a motor-truck, its axles and boxes, the combination with a frame supported by said boxes, a cross-bar spring-supported on said frame, a motor partly supported on one of the axles and by the cross-bar, and guides for the cross-bar on said frame.

8. In a motor-truck, its axles and boxes, the combination with the axle-box frame, of a cross-bar, posts extending between the cross-bar and side bars of said frame, springs about the posts on which the cross-bar rests, and a motor partly supported on one of the axles and by said cross-bar.

9. In a motor-truck, its axles and boxes, the combination with the axle-box frame, of a cross-bar, posts extending between the cross-bar and the side bars of said frame, springs about the posts on which the cross-bar rests, a motor partly supported on one of the axles, and a movable connection between the free end of the motor and the cross-bar.

10. In a car-truck, the side bars of the axle-box frame composed of juxtaposed and parallel bars with turned-up edges, spacing-blocks or thimbles between the latter bars, the cross bar or bars intermediate of the side bar or bars, and means for connecting the side bars with the axle-boxes.

11. In a motor-truck, its axles and boxes, the combination with the frame supported by said boxes, said frame comprising the parallel bars $d^3$, $d^3$, and apertured thimbles J, of posts I passing through the thimbles, springs K about the posts and supported on said bars, a cross-bar secured to the posts and resting on the springs, and a motor partly supported by one of the axles, and partly by said cross-bar.

12. In a motor-truck, its axles and boxes, the combination with the frame supported by said boxes, said frame comprising parallel bars $d^3$, $d^3$, and apertured thimbles J, of posts I passing through the thimbles, springs K suitably supported, the cross-bar secured to said posts and supported by said springs, and a motor partly supported by one of the axles and partly by said cross-bar.

13. In a motor-truck, its axles and boxes, the combination with the frame supported by said boxes, posts I passing through the side bars of said frame, springs K about the posts and resting on the side bars, the cross-bar resting on the springs and secured to the posts, the upwardly-extending bracket on the cross-bar, and a motor partly supported on one of the axles and connected with said bracket.

14. In a motor-truck and its axles, the combination of the truck-frame having side bars, the cross-bar extending between the side bars, a spring or springs on the side bars for supporting the ends of the cross-bar, and a motor partly supported by one of the axles and partly by said cross-bar.

15. In combination with the truck of a car and the axles thereof, a motor supported between the side walls of a frame, said frame being pivoted at one end to the axle of the truck and at the other to a cross-bar cushioned on the side frame of the truck, substantially as described.

16. In combination, a motor, a frame supporting said motor between its side walls at one end, said frame having a rear extension pivoted to the axle of the car, driving connections between the motor and the car-axle carried by the frame, a cross-bar connecting the longitudinal bars of the truck beneath the motor, and a cushion between said cross-bar and the truck-frame, substantially as described.

17. In combination with a propelling-motor having a support on a car-axle by journal-bearings, and a truck-frame, a motor-holder comprising a cross-bar forming part of the truck-frame, with a spring or buffer between each end of the cross-bar and the truck-frame, substantially as described.

18. The combination with a motor and its upholding cross-bar, of the springs, the motor pivotally connected with the cross-bars and one or more retaining-bolts for the cross-bar connected to the side frames of the truck, substantially as described.

19. In combination with a propelling-motor of an electric car, a cross-bar constituting a holder for said motor and resting on the truck-bars with springs or buffers interposed, substantially as described.

20. In a car-truck, the side bars of the axle-box frame composed of juxtaposed and parallel side bars with turned-up edges, spacing-blocks or thimbles between the latter bars, a cross-bar extending between the side bars, posts secured to the cross-bar and guided by the thimbles, and springs resting on the side bars supporting said posts.

21. In combination with a propelling-motor of an electric car, a cross-bar constituting a holder for said motor and resting on the truck-bars with springs or buffers interposed, and guides in the truck-bars for said cross-bar, substantially as described.

22. In combination with the truck side bars, of a cross-bar, springs supporting the cross-bar on the side bar, and guide-posts in the side bars secured to the cross-bar.

23. In an electric-motor car, the combination of an electric-motor frame journaled at one end upon a car-axle, with a cross-bar extending between the side bars of the truck-frame, said bar having flanged ends, springs or buffers separating said ends and side bars and lying within said ends, a bolt or bolts connecting the ends and side bars, and a connection between the cross-bar and the other end of the motor-frame, substantially as described.

24. The combination of an electric-car motor journaled at one end to a car-axle, with a cross-bar extending between the side bars of the truck-frame and elastically mounted on said frame, and a mechanical connection between the free end of the motor and the middle of the cross-bar, substantially as described.

25. The combination with the two axles of a truck, and a truck-framing joining the same, of an intermediate motor having one end journaled on one axle, a frame for the motor and its associated parts, a cross-bar, a mechanical connection for the free end of the motor and said cross-bar, and a spring-support upholding the cross-bar on said frame.

26. The combination with the opposite axles of a truck, of an intermediate motor secured at one end to one of the axles, a frame joining the axles, a cross-bar secured to the free end of the motor, a spring-support for the cross-bar on the frame, and a car-body having a spring-support on the axles independently of said frame.

27. The combination of the axles of a railway-truck, and a framing mounted thereon, with an electric motor having at one end a bearing upon an axle independent of said framing, a cross-bar to which the motor free end is secured, a spring-support for the cross-bar on said framing, whereby the free end of the motor is upheld, and a car-body having a spring-support independent of said framing.

28. The combination of the side bars of the truck-frame bearing on the axles of the truck, and an electric motor having at one end a bearing upon one axle at a point between the frame-bars, with a mechanical connection between the motor and frame-bars consisting of a spring-supported cross-bar upholding the free end of the motor, and a car-body having a spring-support independent of the said frame.

29. The combination of the truck-frame side bars bearing on the axles outside of the wheels, and a transverse bar spring-supported on the side bars between the wheels, with a motor having a bearing at one end upon the axle between the wheels and a connection to the transverse bar upholding the free end of the motor.

30. The combination of the truck-frame joining the axles, with a motor having a bearing at one end upon the axle, and a connection to the frame, through a spring-supported cross-bar located at a point intermediate between the axles, upholding the free end of the motor, and a car-body having a spring system independent of said frame.

31. The combination of the axles of a railway-truck and a frame joining the same, with a propelling electric motor having an armature-shaft parallel to the axles, one end being journaled on the axle, and the free end having a yielding suspension from the said truck-frame comprising a cross-bar secured to said free end and spring-supported on said frame.

32. The combination in an electrically-propelled vehicle, of the side bars joining the journal-boxes outside of the wheels and holding them in position, a motor centered upon an axle of the vehicle and provided with a framing independent of the side bars and holding the associated parts of the motor, with a connection between said framing and the side bars upholding the free end of the motor, said connection comprising a cross-bar secured to said free end, and springs for supporting said cross-bar on the side bars.

33. The combination in an electrically-propelled vehicle of a motor centered on an axle thereof, a framing including the bars $e^7$ having a bearing on the axle between the wheels and carrying the associated parts of the motor, with a connection from the free end of the motor to the outside journal-boxes comprising a cross-bar, and springs supporting the cross-bar on the truck-framing, by which the said free end is upheld independently of the car-body.

34. The combination in an electrically-propelled vehicle, of a motor centered on an axle thereof, a journal-bearing between the wheels supporting one end of the motor, a framing attached to boxes outside the wheels, a vehicle-body spring-supported on said boxes, and a connection between the framing and the free end of the motor comprising a cross-bar spring-supported on said framing, by which the free end of said motor is supported.

35. The combination with the driven axle of a railway-truck, of an electric motor having one end journaled directly upon one axle independently of the truck-frame, a yielding suspension comprising a cross-bar spring-supported on the truck-frame and secured to said free end and upholding said end, and power-transmitting connections between the motor and said axle.

36. The combination of the electric motor having a bearing at one end upon one axle of the truck, with the truck-frame having a transverse bar, as at H, a motor-frame supporting the associated parts of the motor, and a resilient connection of said transverse bar to the truck-frame, said bar upholding the free end of the motor.

37. The combination of an electric motor having a bearing at one end upon an axle of a railway-truck, and a yielding suspension upholding the free end at a point between the car-axles, said suspension comprising a cross-bar resiliently supported upon the truck-frame, and power-transmitting gearing between the motor and said axle.

38. The combination of a driven axle of a vehicle, and a propelling electrical motor having one end bearing upon the axle and a connection between the motor and said vehicle at an intermediate point between the axles, comprising a resiliently-supported cross-bar, secured to the motor and upholding its free end.

39. The combination of a frame joining the axles of a motor-truck, with an electric motor having one end journaled upon one axle independent of the frame, and a mechanical connection between the motor and the frame comprising a resiliently-supported cross-bar upholding the free end of the motor.

40. The combination of a driven axle of a vehicle, with a propelling electric motor having an extension from its frame forming a bearing upon the axle, a yielding suspension for the free end of the motor on the truck comprising a resiliently-supported cross-bar, and power-transmitting connections between the motor and said axle, substantially as described.

41. The combination with a driven axle of an electrically-propelled vehicle, of a motor having one end journaled upon said axle, and a framing extending horizontally from said axle, an armature and counter-shaft journaled in said frame, the frame rigidly holding the armature and counter-shaft in alinement with the axle and each other, and supported as a whole by a resiliently-supported cross-bar, said cross-bar having a bearing on an independent frame supported by the axles of the vehicle.

In testimony whereof we affix our signatures in presence of two witnesses.

GEO. MARTIN BRILL.
JOHN A. BRILL.

Witnesses:
R. S. REED,
R. HAWKINS.